United States Patent
Yin et al.

(10) Patent No.: US 9,019,659 B1
(45) Date of Patent: Apr. 28, 2015

(54) WRITE POLE WITH VARYING BEVEL ANGLES

(71) Applicant: Seagate Technology LLC, Cupertino, CA (US)

(72) Inventors: Huaqing Yin, Eden Prairie, MN (US); Wei Tian, Eden Prairie, MN (US); Zhe Shen, Lakeville, MN (US); Kirill Rivkin, Bloomington, MN (US); Jianhua Xue, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/052,300

(22) Filed: Oct. 11, 2013

(51) Int. Cl.
*G11B 5/147* (2006.01)
*G11B 5/187* (2006.01)

(52) U.S. Cl.
CPC .................................... *G11B 5/1871* (2013.01)

(58) Field of Classification Search
CPC ...................................................... G11B 5/3116
USPC ........................................ 360/125.08–125.15
See application file for complete search history.

(56) References Cited

U.S. PATENT DOCUMENTS

| | | | |
|---|---|---|---|
| 7,133,252 B2 | 11/2006 | Takano et al. | |
| 7,777,987 B2 | 8/2010 | Guan et al. | |
| 7,889,456 B2 | 2/2011 | Jiang et al. | |
| 8,233,233 B1 * | 7/2012 | Shen et al. | 360/125.03 |
| 8,264,792 B2 | 9/2012 | Bai et al. | |
| 8,345,384 B1 | 1/2013 | Sasaki et al. | |
| 8,381,392 B2 | 2/2013 | Zou et al. | |
| 8,477,452 B2 | 7/2013 | Sasaki et al. | |
| 2009/0268344 A1 | 10/2009 | Guan et al. | |
| 2013/0001190 A1 | 1/2013 | Bai et al. | |

* cited by examiner

*Primary Examiner* — Joseph Feild
*Assistant Examiner* — Gustavo Polo
(74) *Attorney, Agent, or Firm* — Hall Estill Attorneys at Law

(57) ABSTRACT

A magnetic element can have at least a write pole configured with a write pole tip that has a tip surface oriented at a first angle with respect to an air bearing surface (ABS), a first bevel surface extending from the ABS and oriented at a second angle with respect to the ABS, and a second bevel surface extending from the ABS and oriented at a third angle with respect to the ABS. The first, second, and third angles may be configured to be different and non-orthogonal to each other.

20 Claims, 5 Drawing Sheets

WRITE POLE WITH VARYING BEVEL ANGLES

SUMMARY OF THE INVENTION

Assorted embodiments provide at least a write pole configured with a write pole tip that has a tip surface oriented at a first angle with respect to an air bearing surface (ABS), a first bevel surface extending from the ABS and oriented at a second angle with respect to the ABS, and a second bevel surface extending from the ABS and oriented at a third angle with respect to the ABS. The first, second, and third angles may be configured to be different and non-orthogonal to each other.

DETAILED DESCRIPTION

Modern computing devices have advanced to smaller sizes and more powerful computing capabilities that have allowed for the proliferation of greater amounts of data across wired and wireless networks. Data storage devices have progressed to accommodate such advancement with higher data capacities, faster data access, and reduced form factors. However, decreasing the physical size of various data storage components like data write poles and data reading resistive laminations can degrade performance as magnetic operation is more volatile as such reduced dimensions. Hence, there is a continued industry demand for reduced form factor data storage devices capable of optimized performance associated with consistent magnetic operation.

These issues have rendered a magnetic element with at least a write pole configured with a write pole tip that has a tip surface oriented at a first angle with respect to an air bearing surface (ABS), a first bevel surface extending from the ABS and oriented at a second angle with respect to the ABS, and a second bevel surface extending from the ABS and oriented at a third angle with respect to the ABS with the first, second, and third angles being different and non-orthogonal to each other. The ability to tune bevel surfaces for size and orientation with respect to the ABS allows write flux to be focused along the tip surface to optimize write pole performance despite reduce write pole dimensions. Further, tuning the different bevel surface angles can optimize write field gradient to increase the precision and accuracy of the write pole.

Figure 1:
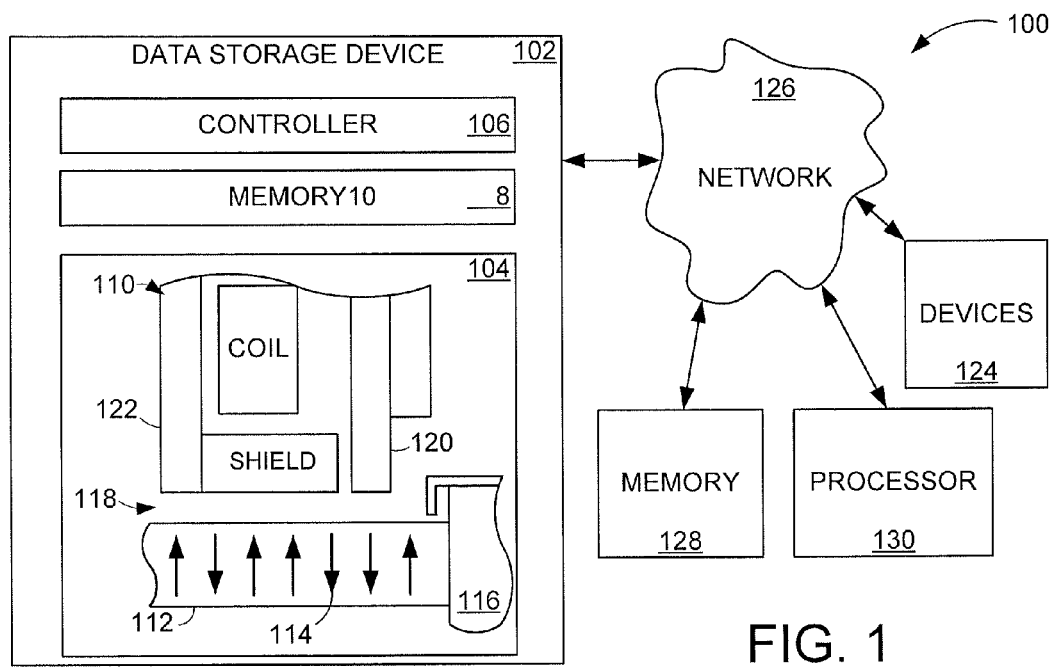
FIG. 1 is a block representation of an example data storage system configured and operated in accordance with various embodiments.

While a write pole having multiple tuned bevel surfaces can be practiced in an unlimited variety of data storage environments, FIG. 1 generally illustrates an example data storage system 100 where a tuned write pole can be employed in accordance with various embodiments. The data storage environment may consist of one or more data storage devices 102 configured with at least one transducing portion 104 that is controlled by a local controller 106 and accesses data temporarily or permanently stored in a local memory 108. As shown, the transducing portion 104 has a transducing head 110 over a magnetic storage medium 112 that is capable of storing programmed bits 114.

The storage medium 112 is attached to and controlled by a spindle motor 116 that rotates to produce an air bearing surface (ABS) 118 on which the transducing head 110 flies to access selected data bits 114 from the medium 112. The transducing head 110 can include one or more transducing elements, such as a magnetic writer and magnetically responsive reader, which operate to program and read data from the storage medium 112, respectively. While not limiting, a magnetic data writing element portion of the transducing head 110 is shown in FIG. 1. The writing element can generate magnetic flux from a coil and emit predetermined amounts of the magnetic flux from a write pole 120 to a return pole 122 through the storage medium 112 in a circuit to impart a polarity that programs at least one data bit 114.

Operation of the data storage device 102 may be conducted concurrently and autonomously with local and remote equipment such as other local data storage devices interconnected in a redundant array of independent discs (RAID) and data storage devices 124 connected to the data storage device 102 via a network 126 and access via appropriate protocol. The wired or wireless network 126 can further provide access to other forms of temporary and permanent data memory 128 as well as computing capabilities via one or more remote processors 130. The unlimited variety of local and remote computing configurations allows the data storage environment 100 to be adapted to a diverse array of applications.

Figure 2:
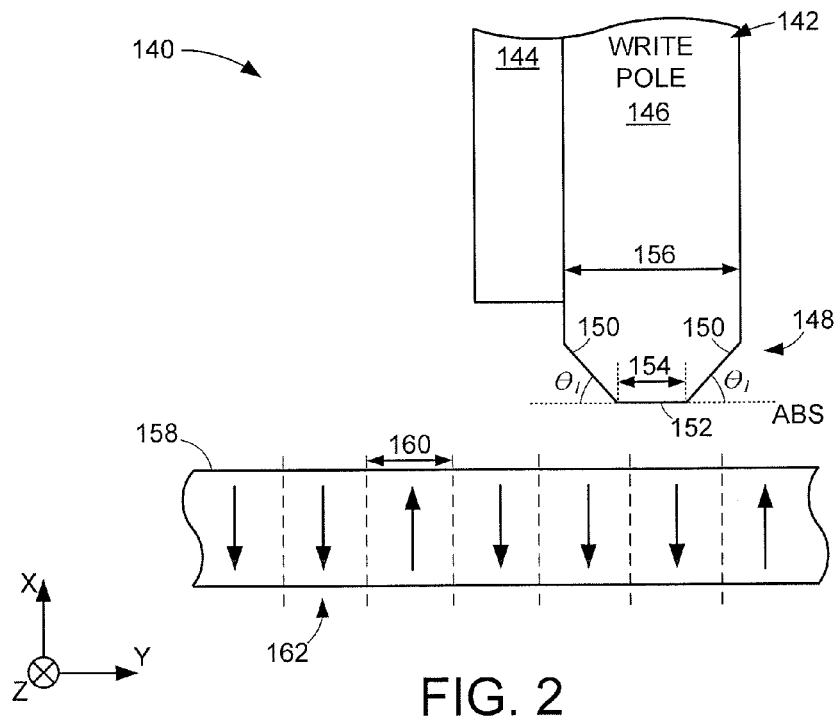
FIG. 2 illustrates a block representation of a portion of an example writing element capable of being used in the data storage system displayed in FIG. 1.

FIG. 2 displays a block representation of a portion of an example writing element 140 constructed and operated in accordance with some embodiments. The writing element 140 is illustrated with a write pole 142 that is configured with a yoke 144 and main write pole 146. The main write pole 146 has write pole tip 148 shaped with sidewalls 150 tapered at a common angle $\theta_1$ that funnels magnetic flux to an ABS portion 152. Tuning of the sidewalls 150 can produce a predetermined ABS portion width 154 along the Y axis that is smaller than the pole width 156 and focuses magnetic flux emission to approximately the portion width 154.

As the areal density of data bits on data medium 158 increases to provide greater data capacity, the bit length 160 associated with data tracks 162 containing one or more data bits decreases. Such reduced track spacing 160 emphasizes the accuracy of function of the write pole tip 148 and specifically the ABS portion 152. That is, the sidewalls 150 and ABS portion 152 are tuned in assorted embodiments to match or have a smaller portion width 154 compared to the bit length 160 so that emitted magnetic flux programs only the data bit below the ABS portion 152 and not adjacent data bits. However, reduction of bit length 160 can correspond with minimized ABS portion width 154 that can restrict magnetic flux emission from the write pole 142 and degrades data bit quality and accuracy. Hence, the magnetic efficiency of the write pole tip 148 is emphasized in reduced portion width 154 configurations.

Figure 3:
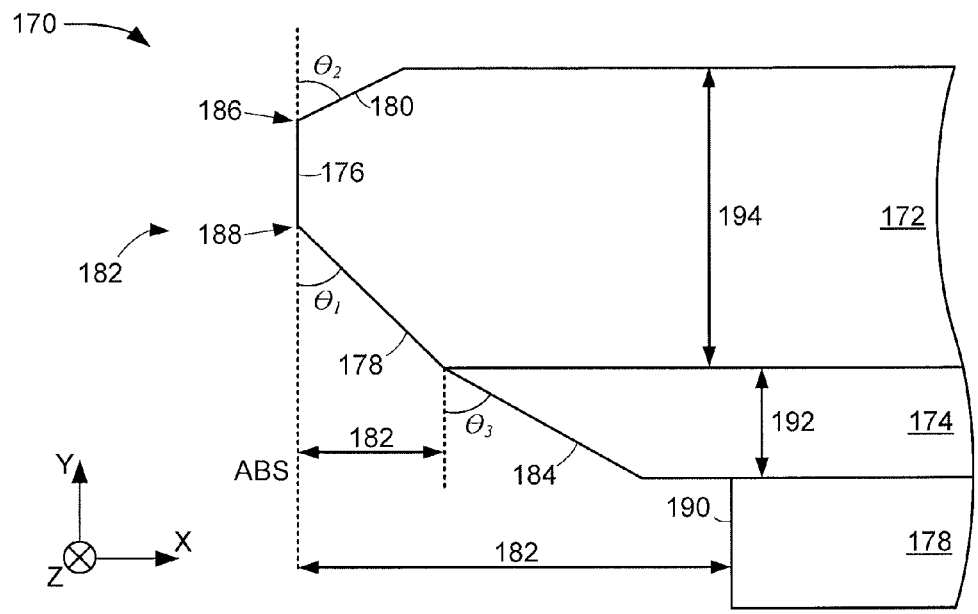
FIG. 3 shows a block representation of a portion of an example write pole configured in accordance with some embodiments.

Accordingly, the write pole 142 can be configured to optimize data bit quality accuracy and magnetic flux delivery in reduced portion width 154 environments, such as sub-100 nm regimes. FIG. 3 is a block representation of a portion of example write pole 170 constructed in accordance with various embodiments to provide optimized magnetic flux delivery. The write pole 170 has a write pole core 172 that continuously contacts a bevel layer 174 uptrack from a tip surface 176 along the Y axis. The bevel layer 174 also contacts a yoke 178 that is placed further uptrack from the write pole core 172 and tip surface 176. The tip surface 176 is resident on the ABS and is configured to be substantially parallel to the ABS along the Y axis while being the apex for first 178 and second 180 bevel surfaces that define the write tip 182 along with the third bevel surface 184 of the bevel layer 174.

The tuning of the various surfaces of the write pole tip 182 can deliver greater magnetic flux to the trailing edge 186 of the write pole 170, which can promote stronger writeability, larger magnetic field gradient, better magnetic flux efficiency, and improve magnetic field dynamics to provide optimized data recording performance. While orienting the first 178 and second 180 bevel surfaces at a common angle with respect to the ABS and Y axis can funnel some magnetic flux to the tip surface 176, miniscule data bit dimensions can render flux emitted from the entire tip surface 176 as inaccurate and lacking sufficient magnetic field. Thusly, the bevel surfaces 178 and 180 can be tuned to each face away from the tip surface 176 while having different angles $\theta_1$ and $\theta_2$ with respect to the Y axis and ABS to focus magnetic flux on the trailing edge 186 of the tip surface 176, as opposed to the leading edge 188 that resides uptrack from and passes over data bits before the trailing edge 186.

The focus of magnetic flux at the trailing edge 186 of the tip surface 176 can allow for precise delivery of data bit programming magnetic fields conducive to sub-100 nm data track spacing. However, the simple asymmetric configuration about the X and longitudinal axis of the write pole core 172 may not sufficiently direct magnetic flux to the tip surface 176. As shown, the bevel layer 174 and its tuned third bevel surface 184 angled away from the tip surface 176 and at an orientation $\theta_3$ that is greater than and non-orthogonal to $\theta_1$ and $\theta_2$ focuses additional amounts of magnetic flux towards the trailing edge 186, which may be a function of being contactingly disposed between the magnetic flux carrying yoke 178 and the flux emitting write pole core 172. It should be noted that the yoke 178 has an ABS facing front surface 190 that is substantially parallel to the ABS and tip surface 176, but such configuration is not required or limiting.

With the multiple different angles $\theta_1$, $\theta_2$, and $\theta_3$ respectively provided by the bevel surfaces 178, 180, and 184, the peak effective magnetic field and perpendicular magnetic field component can be heightened to optimize magnetic field gradient at transition and magnetic flux delivery from the trailing edge 186 and optimize data bit quality. Magnetic flux behavior may further be tuned by adjusting the thickness of the write pole 170 layers along the Y axis, which consequently alters the length of the respective bevel surfaces 178, 180, and 184 to optimize magnetic gradient along the cross-track and Z axis. In the non-limiting example of FIG. 3, the bevel layer 174 has a thickness 192 that is smaller than the write pole core thickness 194 to conduct increased amounts of magnetic flux from the yoke 178 to the write pole core 172 than if the core thickness 194 was larger than the bevel layer thickness 192.

While the tuned bevel surfaces 178, 180, and 184 can efficiently focus magnetic flux to the trailing edge 186 of the tip surface 176 on the ABS, magnetic fields can unintentionally be emitted laterally from the write pole core 172. The emission of magnetic flux from the bevel surfaces 178, 180, and 184 can degrade write pole 170 performance as errant data bits can be inadvertently programmed. Accordingly, soft magnetic coercivity materials can be positioned proximal to, but separated from, the write pole 170 to reduce the amount and effects of errant flux emission.

Figure 4:
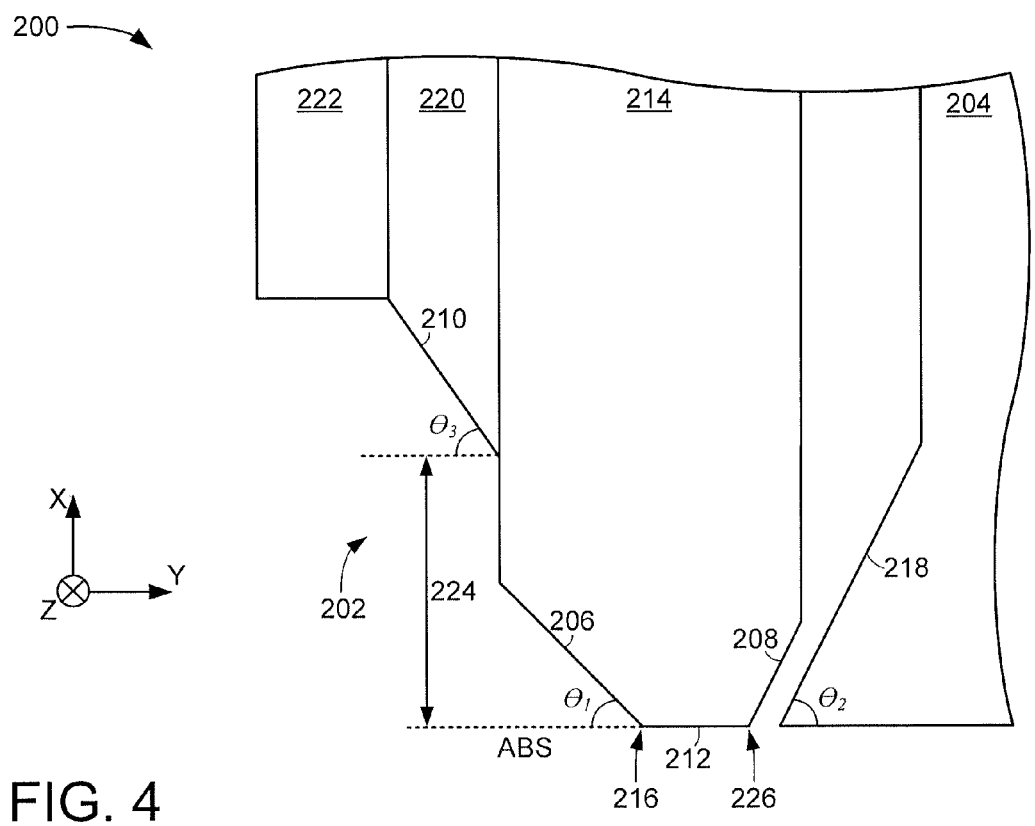
FIG. 4 displays a block representation of a portion of an example magnetic writing element constructed and operated in accordance with various embodiments.

FIG. 4 illustrates a block representation of a portion of an example data writing element 200 configured in accordance with various embodiments to have a write pole 202 adjacent to a trailing magnetic shield 204 on the ABS. The write pole 202 is tuned with bevel surfaces 206, 208, and 210 the respectively face away from a tip surface 212 and are oriented at different, non-orthogonal angles with respect to the Y axis and ABS. The continuous extension of the first 206 and second 208 bevel surfaces from the tip surface 212 and ABS corresponds with heightened risk of inadvertent flux emission laterally from the write pole core 214 instead of from the leading edge 216 of the tip surface 212.

With the tuned orientation of the leading edge second bevel surface 208 to a second angle $\theta_2$ that differs from the first $\theta_1$ and third $\theta_3$ bevel angles, the trailing shield 204 can have a matching taper surface 218 that continuously extends from the ABS to beyond the length of the second bevel surface 208 to catch and dispel magnetic flux emitted laterally along the Y axis from the write pole core 214. The shape of the trailing shield 204 can be tuned, as displayed, to be a closer first separation distance from the second bevel surface 208 at the ABS than a second separation distance from the write pole core 214 distal the ABS. That is, more non-magnetic insulating material can be present between the write pole core 214 distal the ABS than at the ABS to reduce the risk of the leading shield shunting magnetic flux from the write pole 202.

The position of the trailing shield 204 uptrack from the leading edge 216 to which the bevel surfaces 206, 208, and 210 direct magnetic flux can be complemented, in assorted embodiments, by a magnetic shield positioned downtrack from the leading edge 216 on the ABS. The addition of magnetic shields about the write pole 202 can provide varying degrees of accuracy for the emission of magnetic flux from the write pole core 214. However, the tuned shaping of not only the write pole core 214 via the first 206 and second 208 bevel surfaces but the third bevel surface 210 of the bevel layer 220 can more efficiently optimize the accuracy and amount of available magnetic flux in the write pole 202 than magnetic shields.

Various embodiments tune the bevel layer 220 in reference to the size and position of the yoke 222 to deliver magnetic flux efficiently to the write pole core 214. For example, the angle $\theta_3$ of the third bevel surface 210 of the bevel layer 220 and the distance 224 of the bevel layer 220 from the ABS can be adjusted to focus a predetermined amount of magnetic flux to a particular portion of the tip surface 212, such as the leading edge 216 or trailing edge 226. The displacement of the bevel layer 220 from the ABS can minimize the risk of unwanted flux emission while efficiently providing magnetic flux to the write pole core 214. Similarly, separating the yoke 222 from the ABS by a greater distance than distance 224 allows for magnetic flux to pass to the tip surface 212 without inadvertently programming downtrack data bits.

Figure 5:
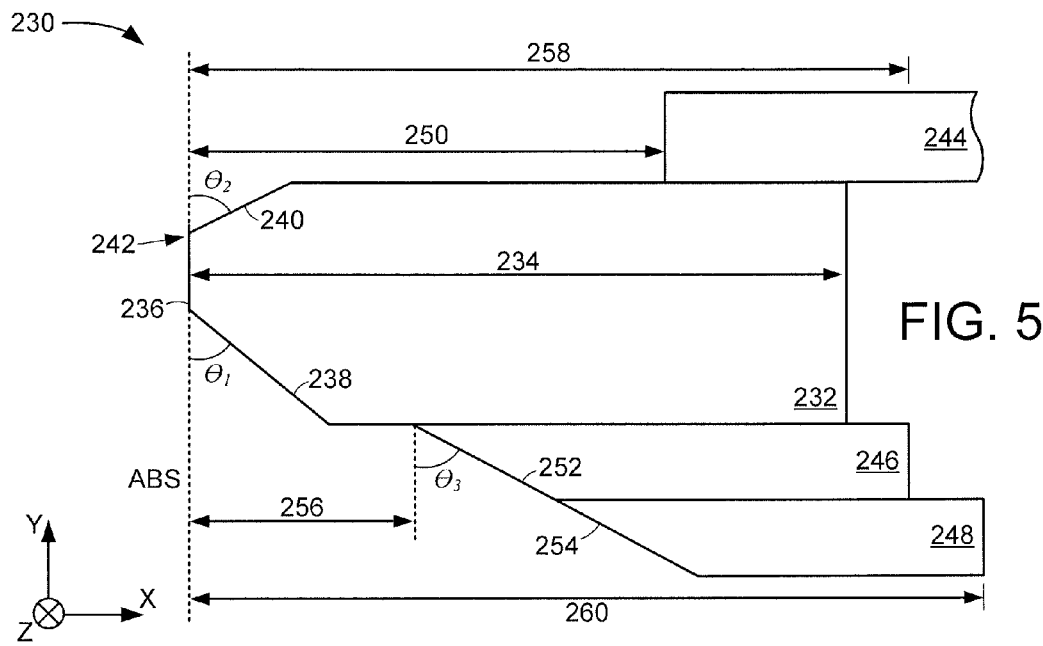
FIG. 5 is a block representation of a portion of an example write pole configured in accordance with assorted embodiments.

FIG. 5 displays a block representation of a portion of an example write pole 230 constructed and operated in accordance with some embodiments. As shown, a write pole core 232 continuously extends from the ABS to a first distance 234 from the ABS and is configured with a tip surface 236 that positioned on the ABS and angled to be parallel to the ABS. First 238 and second 240 bevel surfaces respectively extend from the tip surface 236 and ABS at different, non-orthogonal angles $\theta_1$ and $\theta_2$ to focus magnetic flux to a trailing edge 242 of the tip surface 236. In contrast to the write pole 202 of FIG. 4, the leading side first bevel surface 238 has a longer length and lesser angle with respect to the ABS than the trailing side second bevel surface 240.

Further in contrast to write pole 202 of FIG. 4, the yoke 244 contacts the write pole core 232 on the trailing side, opposite the first 246 and second 248 bevel layers positioned uptrack from the tip surface 236 on the leading side of the write pole core 232. Contacting the write pole core 232 with the yoke 244 without an intervening bevel layer may allow an elevated amount of magnetic flux to be available at the tip surface 236. However, the displacement distance 250 of the yoke 244 from the ABS can serve to throttle magnetic flux, which supports the use of at least one bevel layer constructed with a material and thickness tuned to efficiently focus magnetic flux towards a selected portion of the tip surface 236, such as the trailing edge 242, without unduly restricting the amount of magnetic flux passing to the write pole core 232 from the yoke 244.

Regardless of where the yoke 244 contacts the write pole core 232, the bevel layers 246 and 248 can individually and collectively be tuned to optimize magnetic flux delivery and accuracy of the write pole 230. For a variety of non-limiting reasons, such as manufacturing complexity and controlled flux delivery, the bevel layers 246 and 248 can each have bevel surfaces 252 and 254 that share a common bevel angle $\theta_3$ and continuously extend from the write pole core 232. By displacing the first bevel layer 246 a second displacement distance 256 that is less than the yoke displacement distance 250, magnetic flux can be focused to the tip surface 236 instead of reaching a bottleneck.

The tuning of the bevel layers 246 and 248 can further incorporate extending each layer beyond the length 234 of the write pole core 232 from the ABS. As displayed, the first bevel layer 246 can continuously extend from the second displacement distance 256 to a first bevel length 258 from the ABS that overhangs the write pole core 232 and can be adjusted to tune the manner in which magnetic flux flows toward the ABS along the core length 234. The staggering of bevel layer lengths from the first bevel length 234 from the ABS to the first bevel length 258 from the ABS to the second bevel length 260 from the ABS may further contribute to elevated levels of magnetic flux being available at the trailing edge 242 of the top surface 236.

With the diverse variety of tuning options in the write pole 230, a range of different data storage environments, like high areal density, bit patterned media, and small form factor environments, can be accommodated. However, the position of bevel layers 246 and 248 on a single selected side of the write pole core 232 is not limiting as a multitude of bevel layers can be utilized, without restriction, to control the magnetic flux delivery and accuracy of a writing element.

Figure 6:
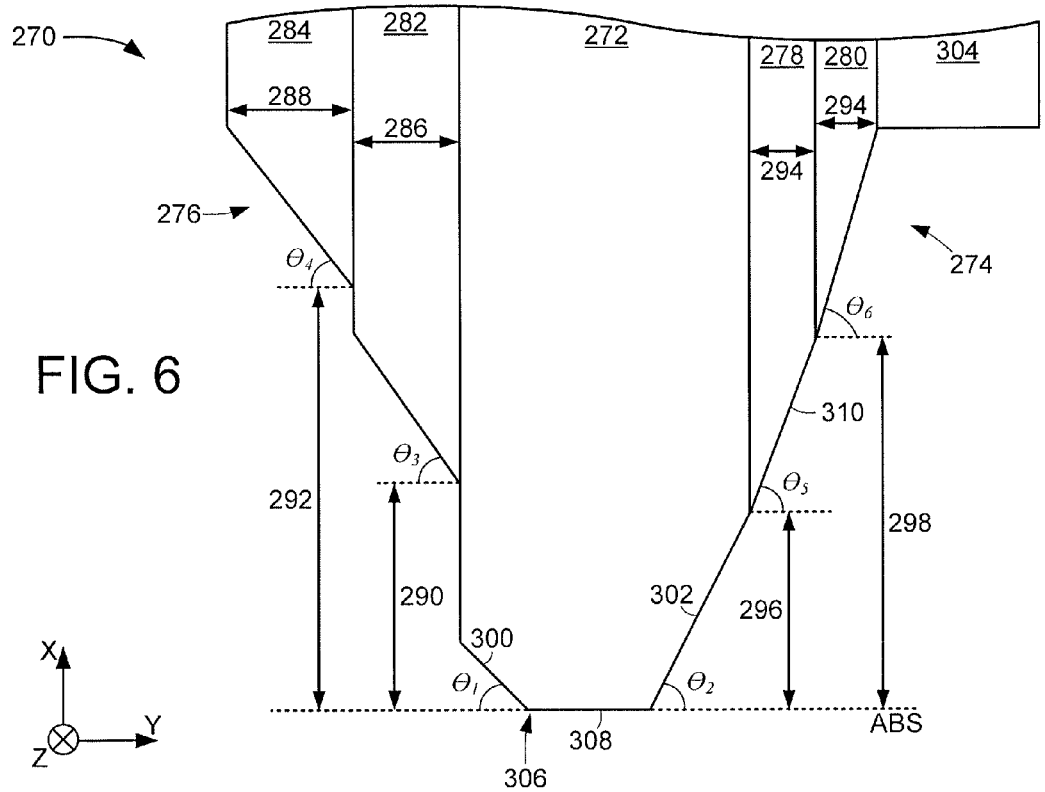
FIG. 6 illustrates a block representation of a portion of an example write pole constructed and operated in accordance with various embodiments.

FIG. 6 illustrates a block representation of a portion of an example write pole 270 configured in accordance with various embodiments to dispose a write pole core 272 between leading 274 and trailing 276 pairs of bevel layers 278, 280, 282, and 284. The trailing pair 276 of layers are constructed with different thicknesses 286 and 288, as measured along the Y axis, different bevel angles $\theta_3$ and $\theta_4$, and different displacement distances 290 and 292 from the ABS. Meanwhile, the leading pair 274 have a common thickness 294 with different displacement distances 296 and 298 as well as different bevel angles $\theta_5$ and $\theta_6$.

Although not required or limiting, the various thicknesses 282, 284, and 290 along with the bevel angles $\theta_3$, $\theta_4$, $\theta_5$, and $\theta_6$ can each be different in assorted embodiments while other embodiments have at least two thicknesses and bevel angles being the same. The ability to tune the various bevel layers 278, 280, 282, and 284 for a plethora of structural characteristics can allow precise control of magnetic flux saturation and delivery from the write pole core 272. For example, tuning the leading 274 and trailing 276 pairs of bevel layers with differing magnetic and non-magnetic materials as well as with structure that complements the ABS bevel surfaces 300 and 302 and angles $\theta_1$ and $\theta_2$ can reduce write pole core 272 saturation time after programming one or more data bits and focus the magnetic flux transmission from the yoke 304 to the trailing edge 306 of the tip surface 308 on the ABS.

The combination of tuned bevel layers on leading and trailing sides of the write pole core 272 along with the asymmetric configuration of the write pole core 272 about its longitudinal axis that is perpendicular to the ABS can focus magnetic flux to a selected uptrack, leading 310 surface of a bevel layer or downtrack, trailing edge 306 of the core 272 to accommodate the write pole 270 to a variety of different data storage environments.

Figure 7:
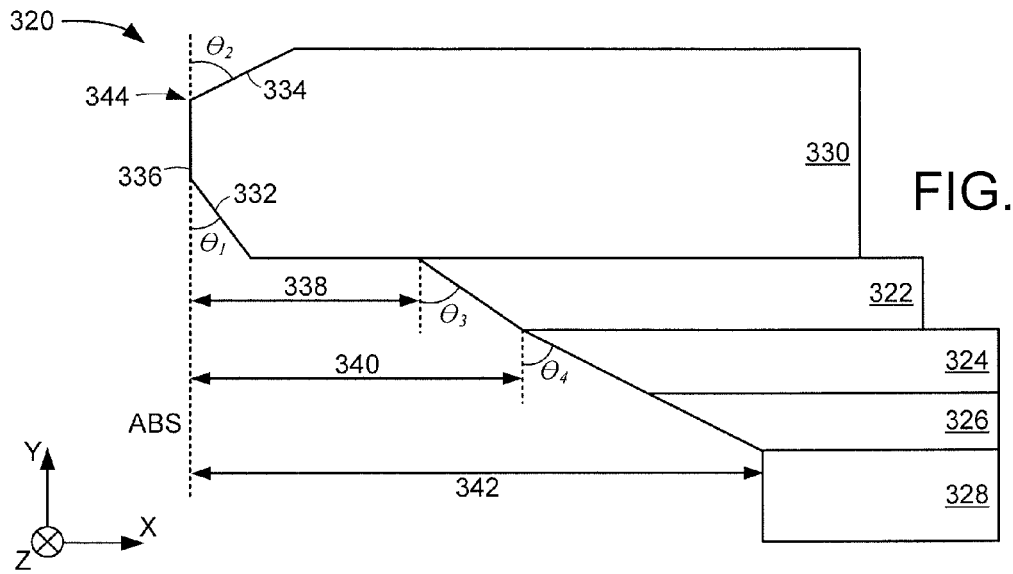
FIG. 7 shows a block representation of a portion of an example write pole configured in accordance with some embodiments.

FIG. 7 displays a portion of another exemplary write pole 320 configured in accordance with some embodiments to have both bevel layers 322, 324, and 326 and a yoke 328 on a common leading side of the write pole core 330. As shown, the write pole 320 has an asymmetrical write pole core 330 construction on the ABS with first 332 and second 334 bevel surfaces having different angles $\theta_1$ and $\theta_2$, lengths, and extension distances from the ABS. Displacing the first bevel layer 322 from both the first bevel surface 332 and from the ABS can complement the selected bevel angle $\theta_3$ and bevel length to direct optimize magnetic flux gradient and saturation at the tip surface 336.

The addition of the second 324 and third 326 bevel layers between the yoke 328 and first bevel layer 322 can further tune magnetic flux behavior in the write pole core 330 by laterally separating the first bevel layer 322 from the yoke 328 and ABS according to the bevel angle $\theta_4$ and thickness of the bevel layers 324 and 326. Various embodiments configure the displacement distances 338, 340, and 342 of the bevel layers 322, 324, and 326 and yoke 328 in consideration of the respective layer's thicknesses and materials to tune the amount of magnetic flux present at the trailing edge 344 of the tip surface 336.

It should be noted that the various write pole core, bevel layer, and yoke configurations displayed in FIGS. 3-7 are not exclusive or limiting and can be combined, parsed, and altered at will to provide magnetic flux operation that accommodates a particular data storage environment. However, it can be appreciated that the number of bevel layers, bevel angles, layer thicknesses, and ABS displacement distances can all be tuned to optimize the data bit quality and performance of a write pole.

Figure 8:
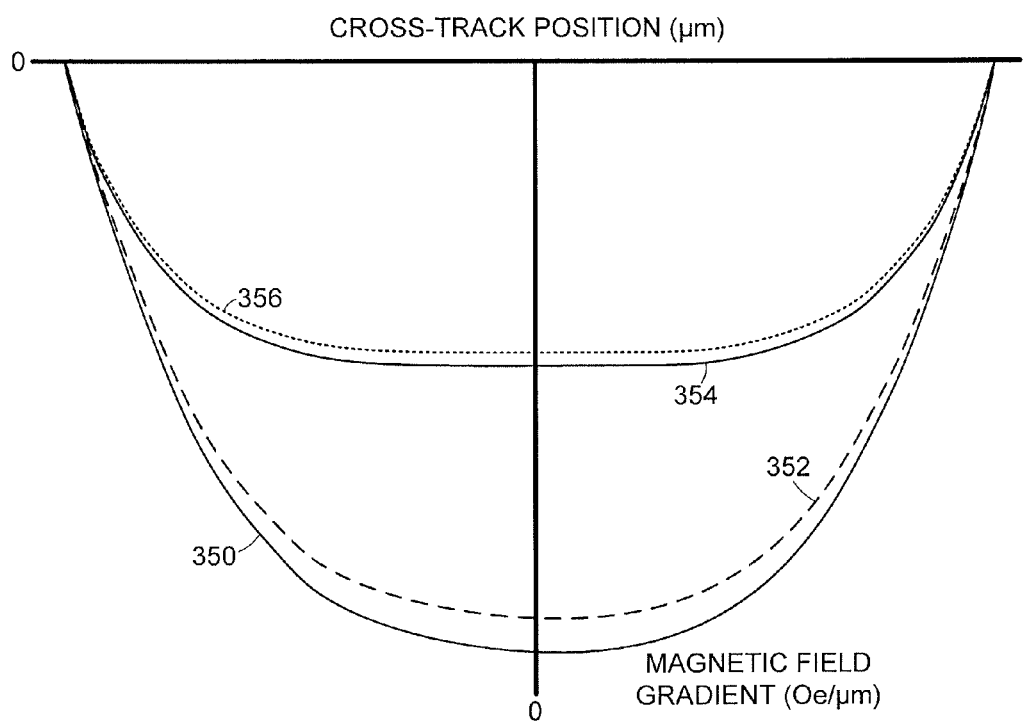
FIG. 8 plots example operational data for a write pole tuned in accordance with assorted embodiments.

FIG. 8 plots example operational data that corresponds with a tuned bevel surface and bevel layer configuration in accordance with assorted embodiments. Solid line 350 shows how magnetic field gradient can change along the cross-track direction, such as a 2 dB overwrite improvement, depending on the cross-track position from a write pole core longitudinal axis when a single tuned bevel layer contacts a write pole core. In contrast, segmented line 352 displays how the incorporation of a second tuned bevel layer reduces the magnetic field gradient for a majority of positions along the cross-track direction.

Solid line 354 and segmented line 356 further illustrate the field gradient perpendicular to the ABS along the cross-track direction, respectively. It can be appreciated that the field gradient in the cross-track direction increases when a second bevel layer is incorporated. While not comprehensive of the diverse variety of bevel layer and write pole core configurations, the difference between lines 350 and 352 as well as lines 354 and 356 respectively convey how tuned bevel layers can optimize data bit quality and performance, especially in high areal density, small form factor data storage devices.

Figure 9:
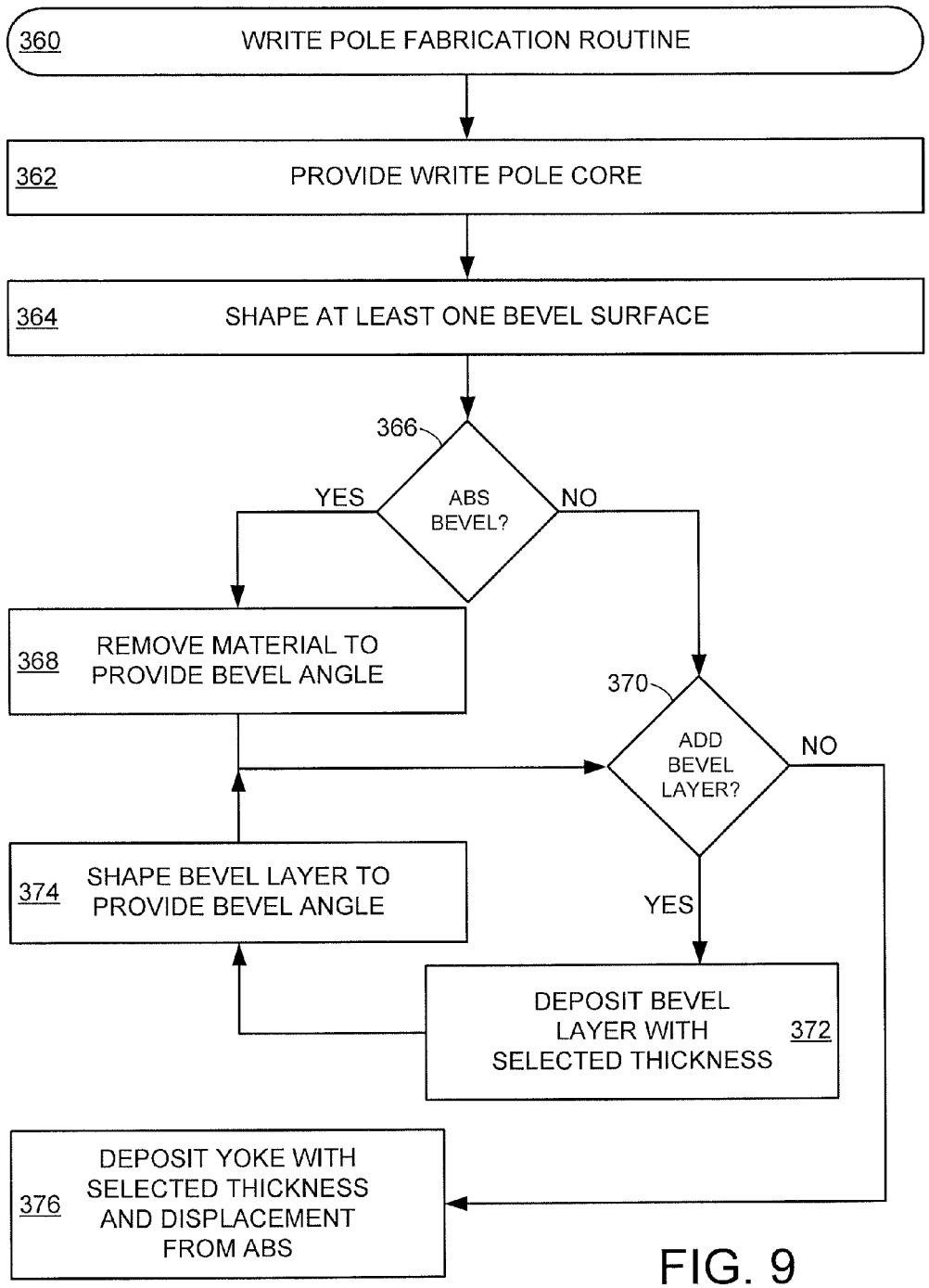
FIG. 9 maps an example write pole fabrication routine carried out in accordance with various embodiments.

Although a write pole with tuned bevel layers can be manufactured in any number of different manners, FIG. 9 provides a flowchart of an example write pole fabrication routine 360 that is carried out in accordance with assorted embodiments to construct optimized write poles that may be similar or dissimilar from the write poles of FIGS. 3-7. The routine 360 can begin with the formation of a write pole core in step 362 that involves depositing a continuously layer of magnetic material with a predetermined thickness. It is noted that in some write pole configurations, other write pole layers like a yoke or bevel layer can be deposited prior to the formation of a write pole core. Hence, step 362 is merely an example first step for routine 360 and by no means limits possible precursory layer manufacturing.

The formation of the write pole core, or a different write pole layer, in step 362 can then be shaped in step 364 with at least one bevel surface that faces the ABS. The creation of a write pole core in step 362 can correspond with the shaping of a tip surface with a predetermined length and at least one bevel surface that extends from the ABS and tip surface with a predetermined, non-orthogonal angle with respect to the ABS for a selected length. The shaping of a bevel surface in step 364 is not limited to a particular fabrication means, but in assorted embodiments encompasses the masking of portions of the write pole core and the subsequent removal of material to define a continuously linear bevel surface facing away from the tip surface at a predetermined angle.

With at least one bevel surface shaped in step 364, decision 366 next evaluates if another ABS contacting bevel surface is to be formed. If another bevel surface is chosen, decision 366 advances to step 368 where material is removed to provide a continuous bevel angle. It is contemplated that step 364 would define a first write pole core bevel surface, such as a leading side bevel, and step 368 would define a second write pole core surface, like a trailing side bevel that establishes a trailing edge of the write pole core. However, step 368 may alternatively form a bevel surface at a predetermined angle for a bevel layer contacting the write pole core and resident on the ABS, without limitation.

Whether step 368 shapes an additional bevel surface or if no additional bevel was chosen from decision 366, decision 370 subsequently evaluates and determines if a bevel layer is to be formed. Step 372 proceeds to deposit a bevel layer of a predetermined material, such as $Ni_xFe_{1-x}$, $Fe_xCo_{1-x}$, CoNiFe, laminated FeCo, and their alloy, with a selected thickness and a length from the ABS that may, or may not, extend a distance past the write pole core length. Next, step 374 shapes the bevel layer deposited in step 372 with a linear, curvilinear, or combination bevel surface by removing portions of the deposited material, which may be in the same or different manner utilized in step 368 before returning to decision 370. The return of step 374 to decision 370 allows multiple bevel layers with differing materials, thicknesses, and lengths from the ABS.

A determination that no additional bevel layers are to be formed in decision 370 triggers step 376 where a yoke is deposited on a selected side of the write pole core with a predetermined thickness, material, and displacement from the ABS. The formation of the yoke in step 376 can yield a completed write pole that is ready to be incorporated into a transducing head. However, it should be noted that the various steps and decisions of routine 360 are not required or limiting as any aspect can be modified, removed, and added. For example, the deposition of a yoke may be followed by one or more steps that form soft magnetic shields about the write pole. In another non-limiting example, the write pole may be mated with a data reader, such as a magnetoresistive lamination positioned on the ABS and separated from the write pole by a magnetic shield.

Through the tuned configuration of a write pole core to have bevel surfaces angled at different, non-orthogonal angles, the writeability and efficiency of data bit programming can be increased. The incorporation of one or more bevel layers positioned on leading and trailing sides of the write pole core and providing different bevel surfaces displaced from the ABS can further control magnetic flux to optimize magnetic field gradient and supply sufficient magnetic flux at precise portions of the write pole core. As such, the ability to tune a write pole with various write pole core, bevel layer, and yoke structural configurations can focus magnetic flux towards the ABS to allow fast data bit programming recovery despite having reduced dimensions, such as sub-100 nm write pole core thickness.

It is to be understood that even though numerous characteristics and various embodiments have been set forth in the foregoing description, together with details of the structure and function, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the technology.

What is claimed is:

1. An apparatus comprising a write pole core having a write pole tip comprising a tip surface oriented at a first angle with respect to an air bearing surface (ABS), a first bevel surface extending from the ABS and oriented at a second angle with respect to the ABS, and a second bevel surface extending from the ABS and oriented at a third angle with respect to the ABS, a first bevel layer contacting the write pole core, the first bevel layer comprising a different material than the write pole core and having a third bevel surface oriented at a fourth angle with respect to the ABS, the first, second, third, and fourth angles being different and non-orthogonal to each other.

2. The apparatus of claim 1, wherein the first bevel surface contacts and extends from the tip surface.

3. The apparatus of claim 1, wherein the second bevel surface contacts and extends from the tip surface.

4. The apparatus of claim 1, wherein a fourth bevel surface corresponds to a second bevel layer contacting the write pole core.

5. The apparatus of claim 1, wherein the first and third bevel surfaces are positioned uptrack from the tip surface and the second bevel surface is positioned downtrack from the tip surface.

6. The apparatus of claim 1, wherein a yoke contacts the write pole distal the ABS and proximal the second bevel surface.

7. The apparatus of claim 6, wherein the yoke has an ABS facing front surface having the first angle.

8. The apparatus of claim 1, wherein the third bevel surface contacts and extends from the second bevel surface.

9. The apparatus of claim 1, wherein a second bevel layer has a fourth bevel surface oriented at a fifth angle with respect to the ABS, the fourth and fifth angles being the same with respect to the ABS.

10. The apparatus of claim 1, wherein a second bevel layer has a fourth bevel surface oriented at a fourth angle with respect to the ABS, the fourth and third angles being different and non-orthogonal with respect to the ABS.

11. The apparatus of claim 1, wherein the first bevel layer is separated from the write pole core and ABS.

12. The apparatus of claim 1, wherein the third bevel surface is displaced from the ABS by a first distance.

13. The apparatus of claim 12, wherein a fourth bevel surface is displaced from the ABS by a second distance that is greater than the first distance.

14. A writing element comprising a write pole having a write pole tip comprising a tip surface oriented at a first angle with respect to an air bearing surface (ABS), a first bevel surface extending from the ABS at a leading edge of the write pole tip and oriented at a second angle with respect to the ABS, and a second bevel surface extending from the ABS at a trailing edge of the write pole tip and oriented at a third angle with respect to the ABS, a first bevel layer contacting the write pole core, the first bevel layer comprising a different material than the write pole core and having a third bevel surface oriented at a fourth angle with respect to the ABS, the first, second, third, and fourth angles being different and non-orthogonal to each other.

15. The writing element of claim 14, wherein the first bevel layer contacts the write pole core downtrack from the tip surface, a second bevel layer contacts the write pole core uptrack from the tip surface and has a fourth bevel surface oriented at a fifth angle with respect to the ABS, the third and fourth angles being different and non-orthogonal to the first and second angles.

16. The writing element of claim 15, wherein third and fourth bevel surfaces are each displaced from the ABS by a common distance.

17. The writing element of claim 15, wherein third and fourth bevel surfaces are each displaced from the ABS by different distances.

18. The magnetic writing element of claim 15, wherein the first, second, third, and fourth bevel surfaces each face away from the tip surface.

19. The magnetic writing element of claim 15, wherein the first and second bevel layers each having a smaller thickness than the write pole core as measured parallel to the ABS.

20. An apparatus comprising:
a write pole core comprising a first material and having a tip surface positioned on an air bearing surface (ABS), the write pole core having first and second bevel surfaces respectively extending from the tip surface at different first and second angles with respect to the ABS;
a first bevel layer comprising a second material, contacting the write pole core, and having a third bevel surface oriented at a third angle with respect to the ABS;
a second bevel layer comprising a third material, contacting the write pole core, and having a fourth bevel surface oriented at a fourth angle with respect to the ABS;
a third bevel layer comprising a fourth material, separated from the write pole core, contacting the first bevel layer, and having a fifth bevel surface oriented at a fifth angle with respect to the ABS; and
a fourth bevel layer comprising a fifth material, separated from the write pole core, contacting the second bevel layer, and having a sixth bevel surface oriented at a sixth angle with respect to the ABS, the first material being different than the second, third, fourth, and fifth materials.

* * * * *